United States Patent [19]

Bertram

[11] Patent Number: 5,801,941
[45] Date of Patent: Sep. 1, 1998

[54] MOBILE CLIENT COMPUTER PROGRAMMED TO ESTABLISH SOFT KEYBOARD TARGETING SENSITIVITY

[75] Inventor: Randal Lee Bertram, Raleigh, N.C.

[73] Assignee: International Business Machines Corporation, Armonk, N.Y.

[21] Appl. No.: 700,606

[22] Filed: Aug. 12, 1996

[51] Int. Cl.⁶ .................................................... G05B 00/00
[52] U.S. Cl. .................................................... 364/188
[58] Field of Search ........................... 364/188, 900; 345/157, 146; 340/706; 395/792; 382/178; 178/18

[56] References Cited

U.S. PATENT DOCUMENTS

| | | | |
|---|---|---|---|
| 4,587,630 | 5/1986 | Straton et al. | 364/900 |
| 5,010,323 | 4/1991 | Hoffman | 340/706 |
| 5,159,159 | 10/1992 | Asher | 178/18 |
| 5,250,929 | 10/1993 | Hoffman et al. | 345/146 |
| 5,308,936 | 5/1994 | Biggs et al. | 178/18 |
| 5,488,392 | 1/1996 | Harris | 345/157 |
| 5,590,257 | 12/1996 | Forcier | 395/792 |
| 5,600,735 | 2/1997 | Seybold | 382/178 |

FOREIGN PATENT DOCUMENTS

| | | |
|---|---|---|
| 0271276 | 6/1988 | European Pat. Off. |
| 0326751 | 8/1989 | European Pat. Off. |

OTHER PUBLICATIONS

Panttaja, Elisabeth, "Touch Screens . . . the computer", Electronics, pp. 140–144, Apr. 19, 1984.

*Primary Examiner*—Reba I. Elmore
*Assistant Examiner*—Monica Lewis
*Attorney, Agent, or Firm*—Bernard D. Bogdon; Daniel E. McConnell

[57] ABSTRACT

A computer in which entry of data from an area provided on a display, touch screen or the like is accomplished by the provision of a "soft keyboard". Misentry of data is avoided by providing for the calculation of an offset as may be required by the entry habits of a user which target areas of a defined key cell spaced from the center of the cell.

27 Claims, 10 Drawing Sheets

FIG. 8

Candida Form

Main | Back | ▽ | ⇐))))) | 🗎 | ? | ⇓ | ⇑ | ▷❙ | ⇐ | ⇒

→ Candida Bloodstream Infections Multicenter Study

Center [12]    Hospital number [123456789]
Date of birth [04-29-54]    Male ○  Female ○
Date of admission [04-29-54]    Date admission ICU [04-29-54]
Primary ICD9 [    ]    Secondary ICd9 [    ]

Record 1 of 6

Date of surgery [    ]    Type [Access Procedure]
Minutes [    ]    Anesthesia [    ]    Class [Clean-contaminated]
ASA score [    ]    Urgency [    ]

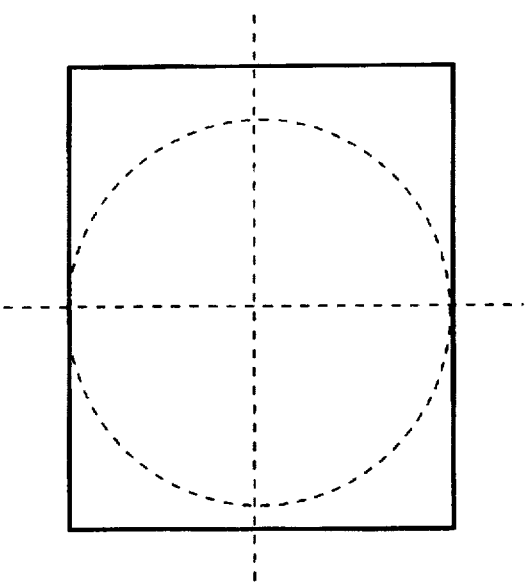
FIG. 10
FIG. 11
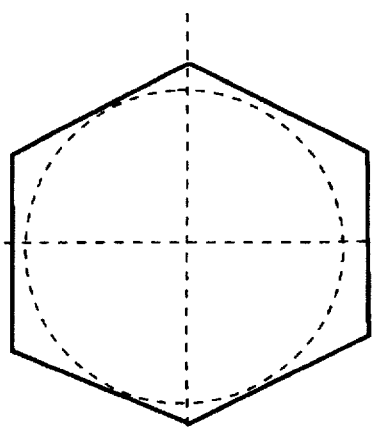
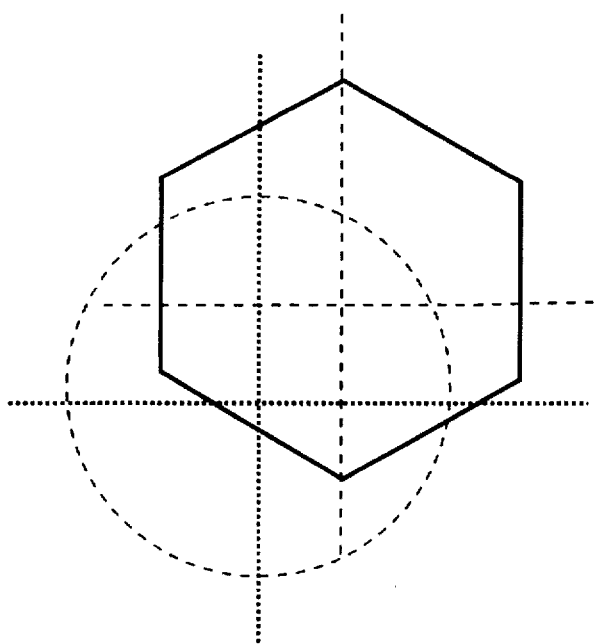
FIG. 12

5,801,941

MOBILE CLIENT COMPUTER PROGRAMMED TO ESTABLISH SOFT KEYBOARD TARGETING SENSITIVITY

RELATED APPLICATIONS

This application is one of a series of related applications assigned to common ownership. Other applications in the series include Application Ser. No. 08/700,608, filed Aug. 12, 1996 entitled "Mobile Client Computer Programmed to Display Hexagonal Keyboard" with named inventors R. L. Bertram, D. F. Champion and L. S. Eichorn and applications identified therein as being related to that application.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

Computers often present a "soft keyboard" to the user. The soft keyboard is typically an on-screen representation of a physical keyboard with alphanumeric characters and other controls. The following soft keyboards all use rectangular regions for "keys":

A desktop computer which displays a soft keyboard on the monitor which the user operates with the mouse. This is most useful for small keyboards such as a number pad.

A tablet computer which displays a soft keyboard which the user operates with a stylus. The tablet may rely exclusively on the soft keyboard for keyboard input, not providing a physical keyboard.

A mobile client computer system which displays a soft keyboard which the user operates by touch, similar to a traditional keyboard.

A system which gets input from a touch pad which does not overlay a display. The "keys" are permanent designs on the touch pad's surface. This is a soft keyboard since there are no mechanical keys.

The problem presented in each instance is that rectangular keys waste space in a soft keyboard. The above systems only use the central portions of the rectangles, not the corners. A user's finger, mouse or stylus distributes the probable points of selection radially from the center. With a rectangularly shaped "key region", the probable points of selection are still arrayed in a substantially circular form.

Wasted space in soft keyboards is a serious problem, especially on small screens such as are provided in mobile client systems and especially when there are a lot of keys (e.g. alphanumeric keyboards). Hence, soft keyboards need another shape for keys besides the rectangle. This problem is addressed in the companion application identified above as being related to this application. In accordance with that invention, the problem is solved, at least in a significant part, by the provision of hexagonal shaped keys.

When entering data using a soft keyboard, some users tend to target the lower portion of each key with their finger, input stylus or mouse pointer instead of targeting the center. This increases the probability of accidentally selecting the key below the one desired. It is assumed that users may do this out of a desire to avoid obscuring the character on the key with their input device.

For the same reason, some users tend to target the left or right side of each key, depending on whether the user is left-handed or right-handed. This increases the probability of accidentally selecting the adjacent key.

Finally, users often miss small target areas on the screens of hand-held devices because of parallax. This occurs where the surface which senses the user's input is on a plane above the display surface, so that if the user's line of sight is not perpendicular to the two surfaces and the user's point of selection is faulty. Many hand-held devices provide parallax adjustment to offset the errors caused by the user's line of sight. It is also possible to correct for parallax in the hardware by LCD bias. However, these solutions do not address the first two problems.

These three problems present greater difficulty on soft keyboards that are small. On small devices, the size of the keyboard is limited by the screen dimensions, and the above problems are particularly severe.

SUMMARY OF THE INVENTION

With the foregoing as background, the present invention contemplates a computer in which entry of data from an area provided on a display, touchscreen or the like is facilitated by the provision of a test procedure which establishes, for a user, an offset between the displayed key and the target area for entry. As will be brought out more fully hereinafter, the offset enables improved accuracy of data entry by a user of systems embodying this invention.

A system in which the present invention is embodied may be any of the types of systems mentioned above. The test process is however, particularly useful with a mobile client system of a type to be described hereinafter.

BRIEF DESCRIPTION OF THE DRAWINGS

Some of the purposes of the invention having been stated, others will appear as the following description proceeds, when taken in connection with the accompanying drawings, in which:

FIG. 8 is an illustration of the display screen of the mobile client of FIG. 2 while driven by the execution of an application program on the mobile client to display certain data;

FIG. 10 is a schematic illustration of a rectangular key element and a likely "target zone" for user targeting;

FIG. 11 is an illustration similar to FIG. 10 showing a hexagonal key element and an associated target zone; and FIG. 12 is an illustration similar to FIGS. 10 and 11 showing a hexagonal key element and a displaced target zone.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
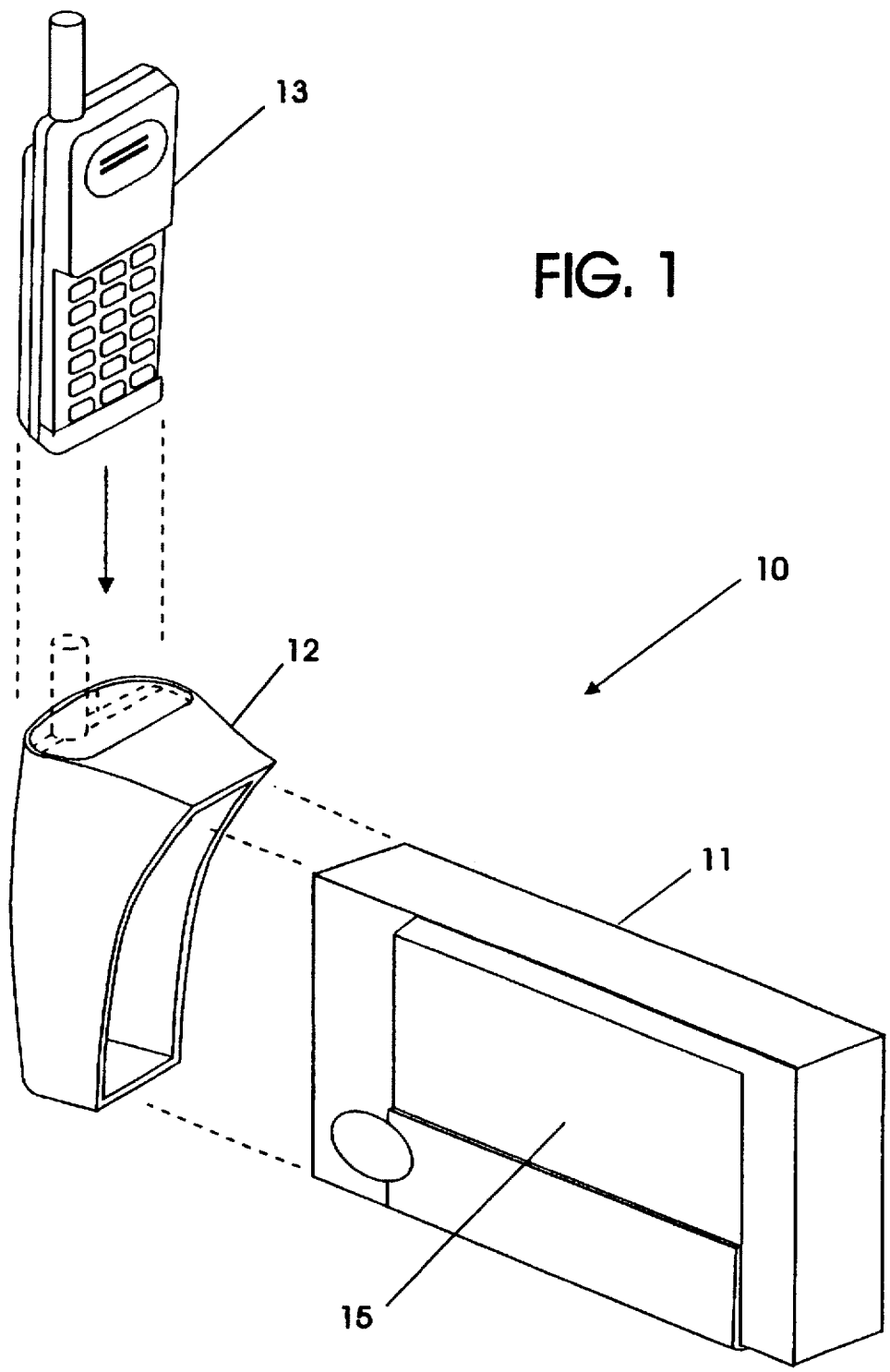
FIG. 1 is an exploded perspective view of certain elements of a mobile client computer system in accordance with this invention.
Figure 2:
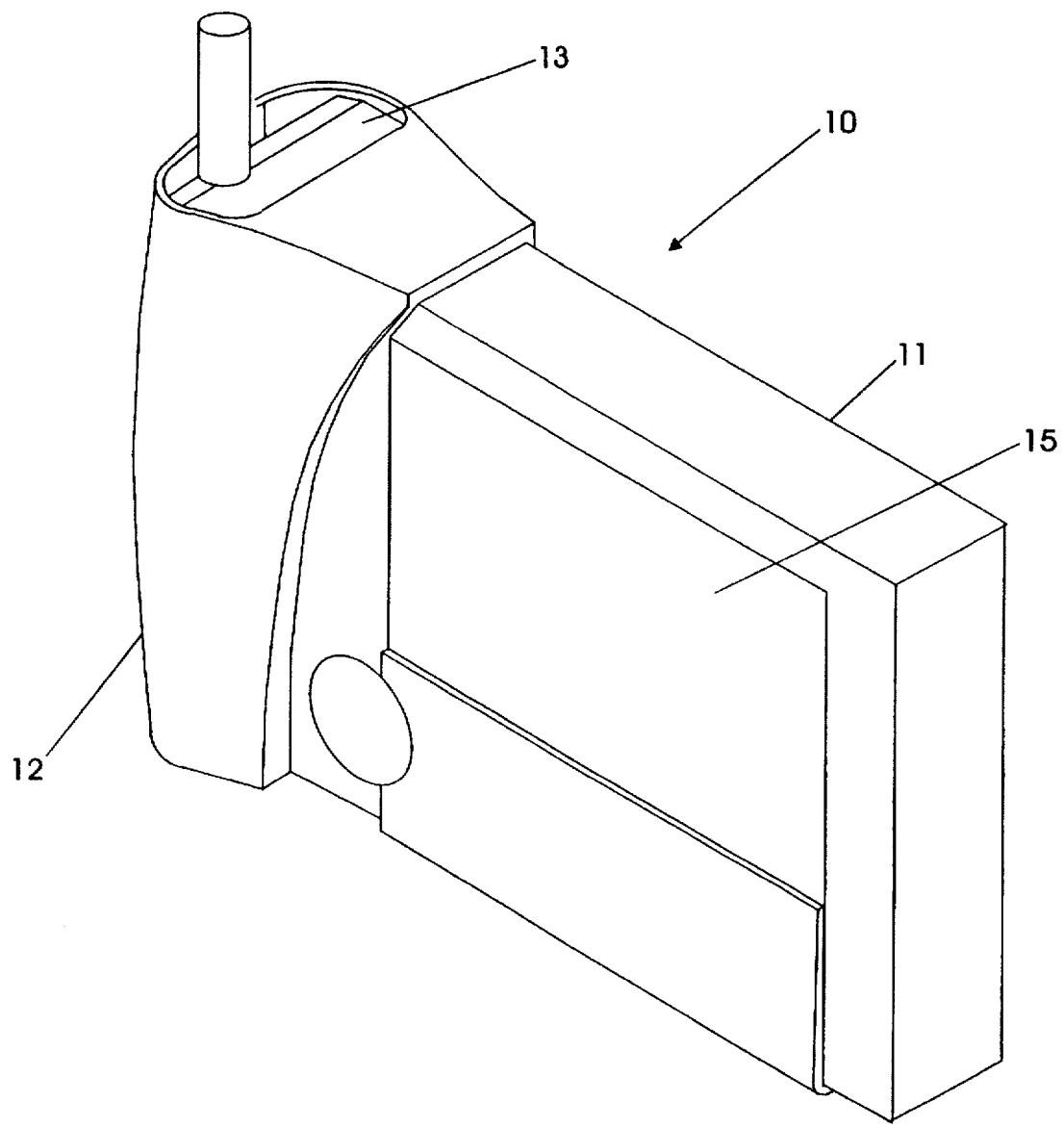
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another. More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
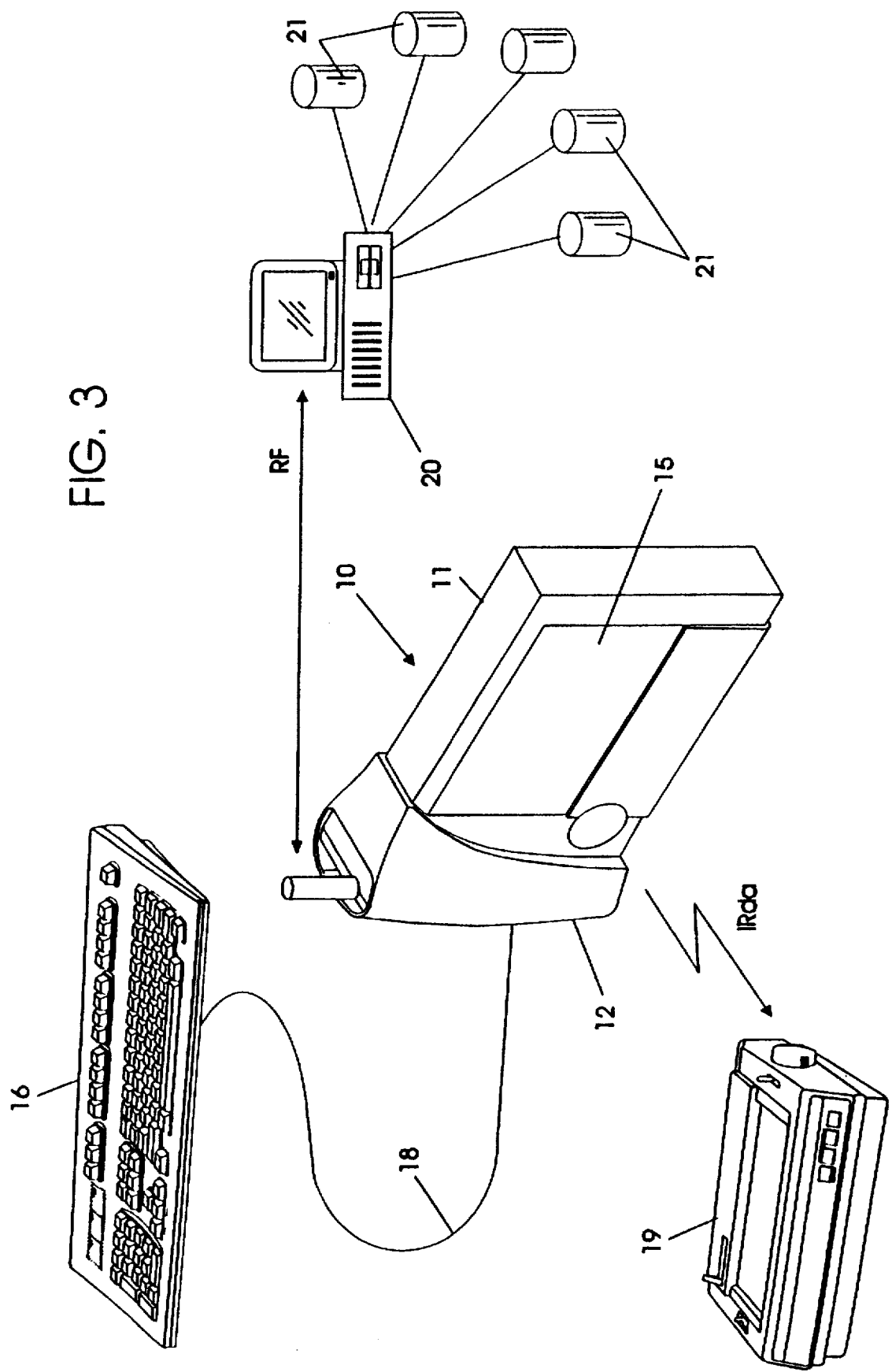
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
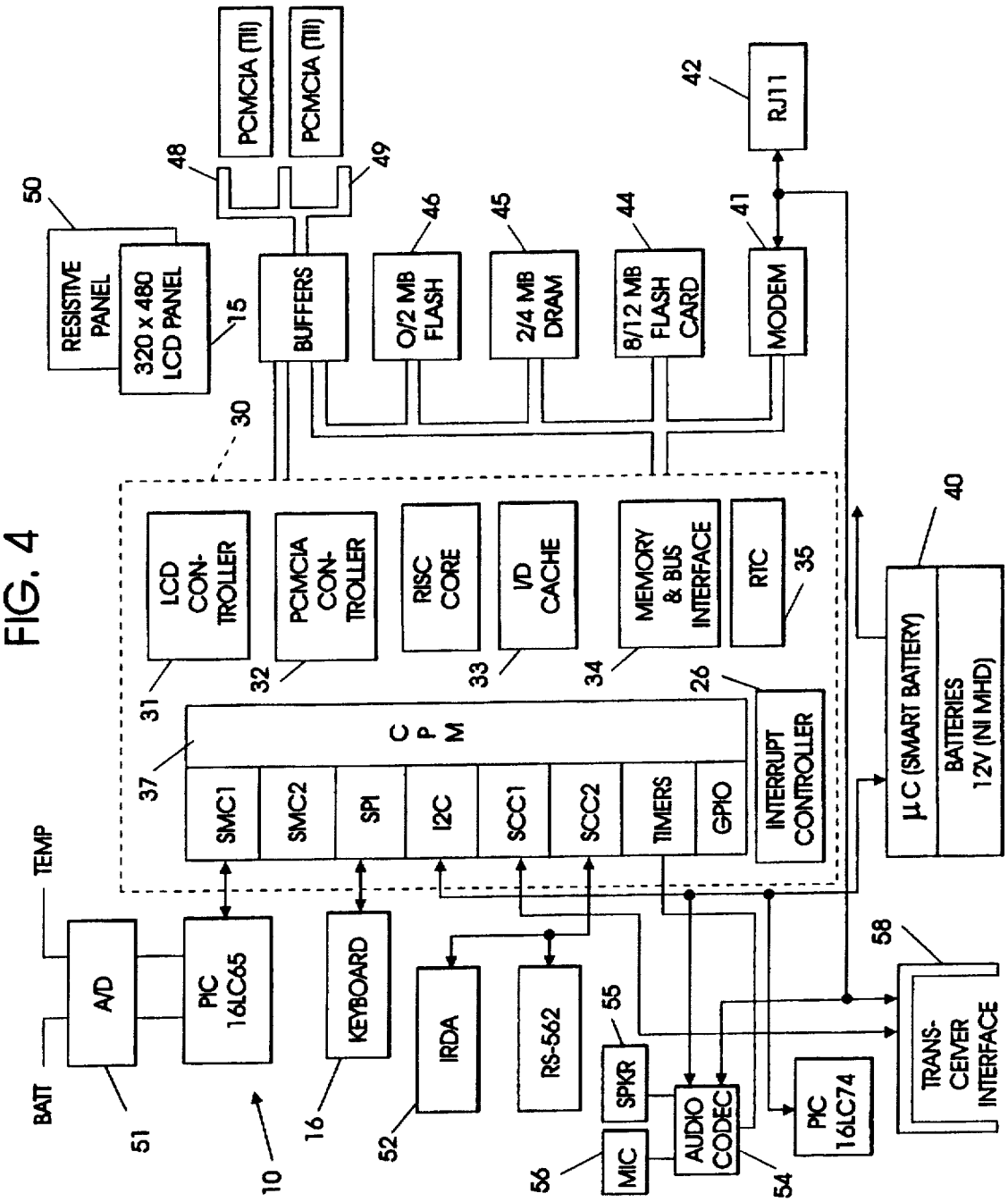
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics. The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 26 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44.; by dynamic random access memory (DRAM) 45; and by core flash memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
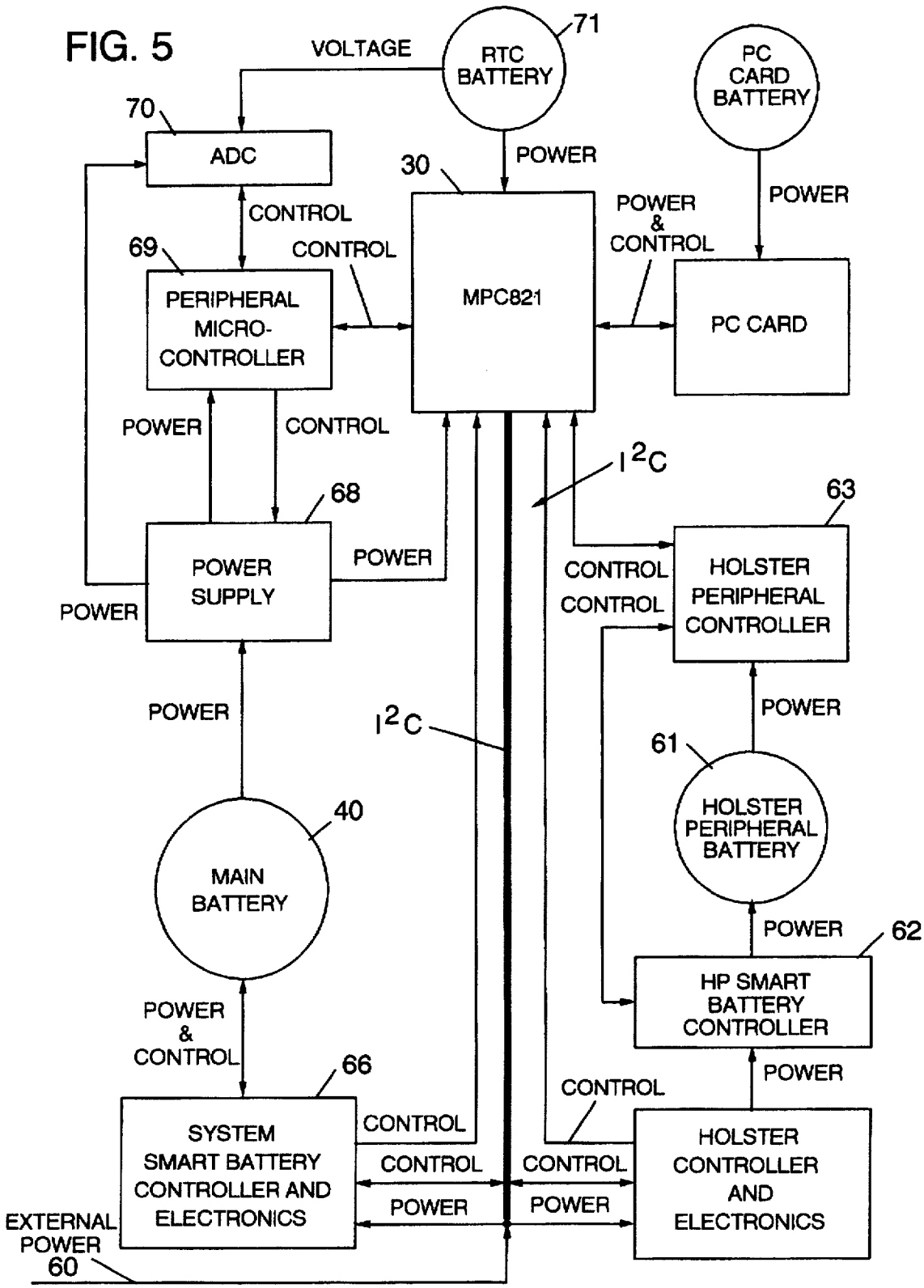
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry identified as system smart battery controller and electronics; 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
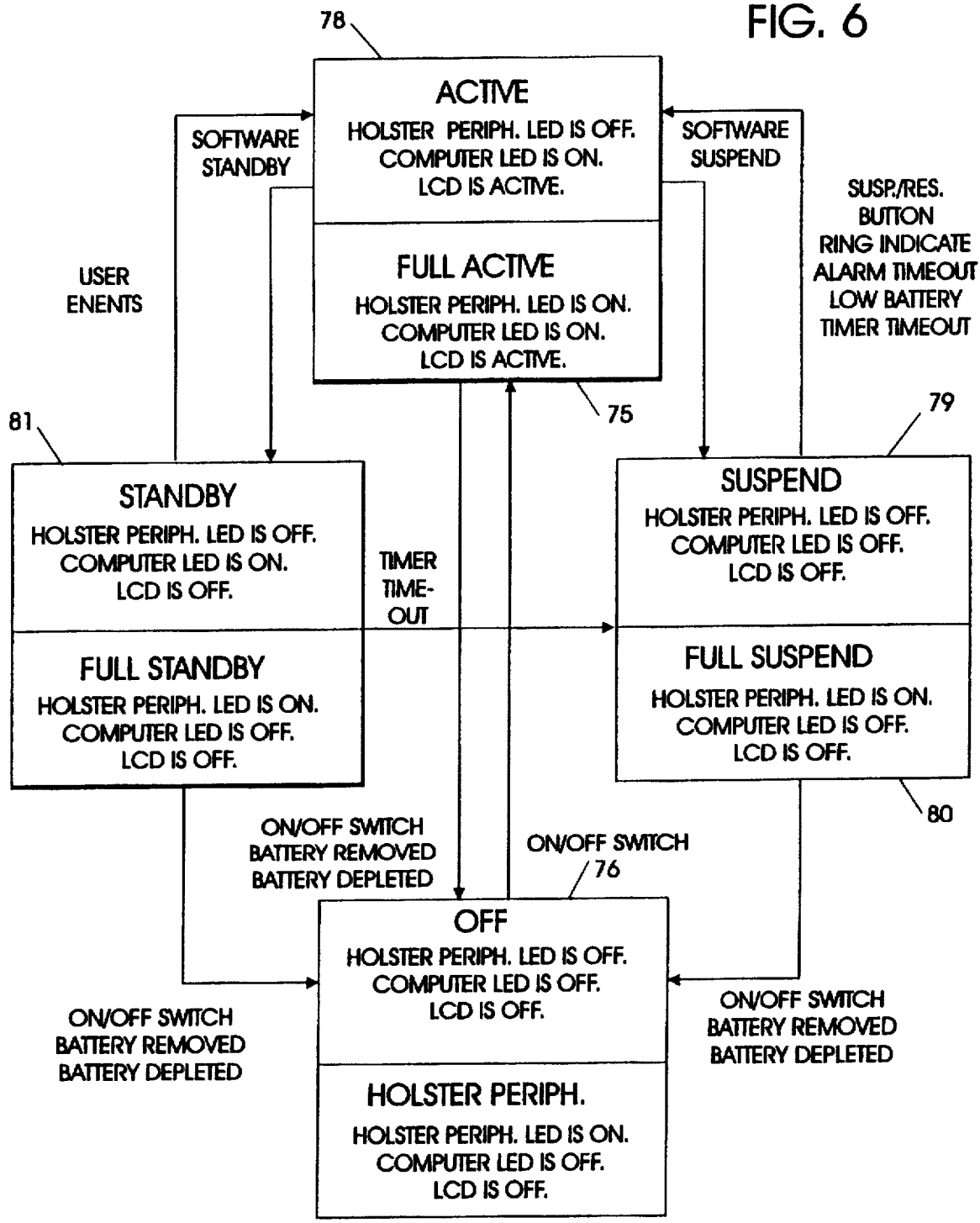
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 1 1, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
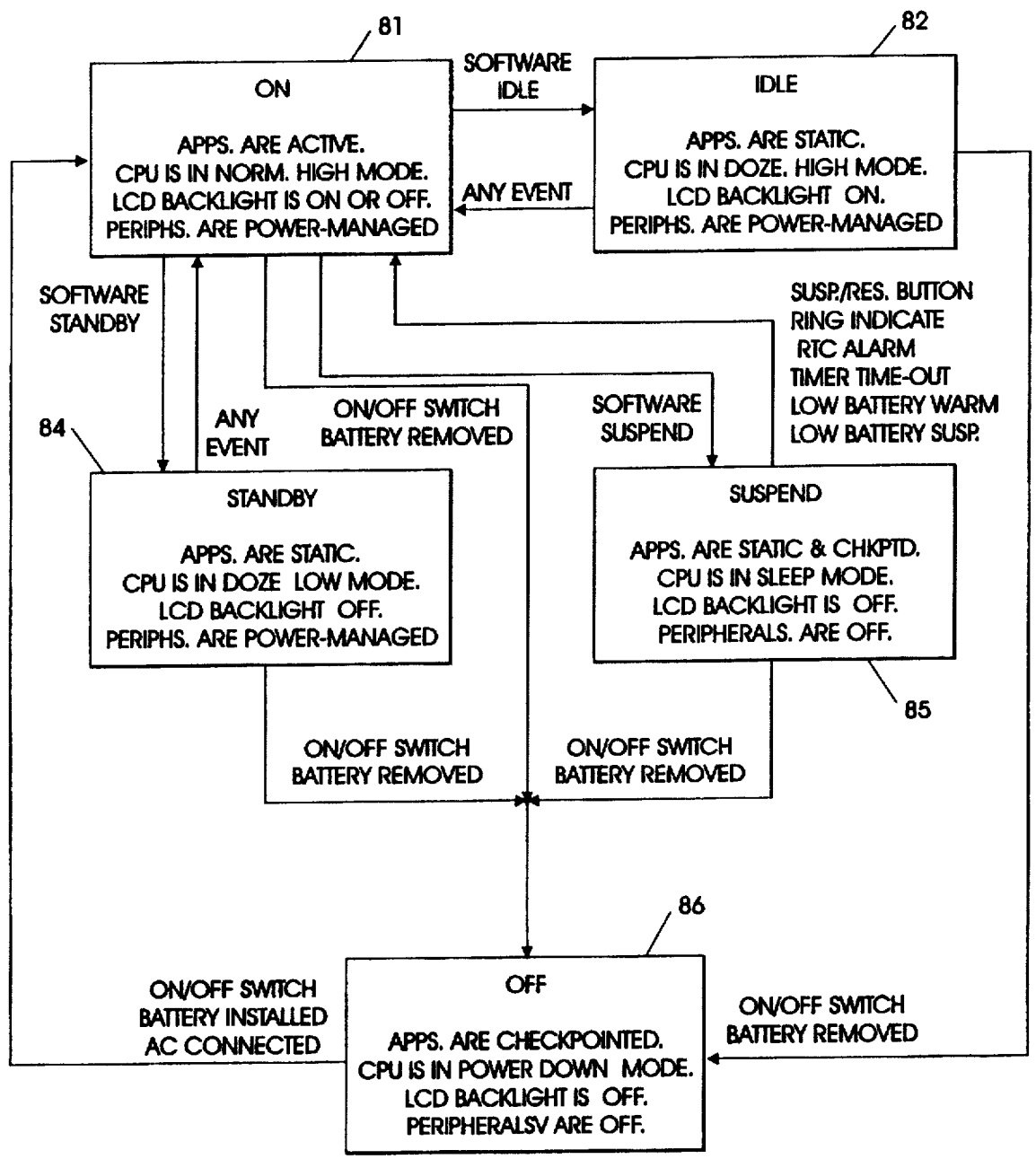
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 8. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another 15 and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could target or touch (with stylus, pointer or finger) the buttons "male" or "female" to enter that data. Similarly, should a user wish to enter an annotation, the user could target or touch the field defined by the notebook icon to change the icon between the closed and open states and thereby open a field for entry of appropriate numerical or alphabetic data. Display of such fields results from execution of a control program by the processor of the mobile client system.

Other and further functions of the control and application programs and the screen display will become more clear from discussion which follows or appears in the above identified related applications.

As will be understood, the area available for display of screens in a mobile client system of the type here described is limited. Such limitations impose severe restrictions on the front of screen technology used in generating displays and in providing for the input of data using a touchscreen overlaying the display area. The present invention contemplates that control programs stored accessibly to the processor of a mobile client system will cooperate with the other elements present, when executing on the processor, in accommodating the restricted display area to the needs of users of the system. This invention focuses particularly on certain of such needs.

Figure 9:
FIG. 9 is an illustration similar to FIG. 8 showing a hexagonal key soft keyboard in accordance with this invention.

In the illustrated embodiment, the present invention uses a soft keyboard displayed on the touchscreen as illustrated in FIG. 9. The arrangement of the keys shown in FIG. 9 includes hexagonal cell keys and is illustrative only, as many other arrangements are possible. The soft keyboard may occupy a window brought up over the remainder of the display when needed for entry of alphanumeric data, may occupy a window which remains in position as a portion of the display at all times, or may occupy the entirety of the available display area during use, depending upon the particular application programs with which the keyboard may interact.

Most of the illustrated keys are perfect hexagons, with the exception that the top and bottom row of keys are truncated in order to fit into a rectangle; some keys are "extended" hexagons, such as the "Space" key (this type of key is irregular itself, and also truncates the keys above and below); and the columns of keys on the right and left are rectangular. The interested reader is referred to the related application mentioned above for further discussion.

The present invention contemplates that the problems of targeting soft keys are solved by the cooperation of a control program and the system processor in executing an offset test. On beginning the offset test, a user is requested to enter a predetermined sequence or test string such as the alphabet or a sentence. As the user targets each character in the test string, the system records the horizontal and vertical displacement or distance of the point of selection from the center of the key. When the user is finished with the offset test, the system averages the horizontal and vertical displacements of each character that was targeted. The averages are then used as "offsets" for all future data entry. For example, should a user target an average of ten pixels below the center of the keys, the system adjusts all future input by raising it ten pixels.

Referring now to FIGS. 10 through 12, FIG. 10 illustrates a rectangular key element such as has been employed heretofore. A set of "cross hair" lines indicate the center point of the key element and a circular target zone defined within the element indicates the likely location of targeting by a user seeking to initiate an input using the key element. The reader is asked to notice that the corners of the rectangular shape are typically avoided. FIG. 11 shows a hexagonal key element with cross hair lines and a circular likely target zone aligned with the key element. The reader is asked to notice that the utilization of the keyboard area is significantly enhanced. That is, there is less inactive space within the key element. FIG. 12 shows a hexagonal key element and a target zone which is displaced from the center of the key element, as would be appropriate should a user practicing this invention target to the left of and below the center of the key element. The centers of the key element and the target zone are indicated by respective sets of cross hairs.

One improvement to the system is to use better statistical analysis than simple averaging. For example, a standard deviation might eliminate individual characters that were targeted at an unusual offset, to avoid distortion of the average by the influence of those characters.

Also, it is necessary during the offset test to discard keystrokes that are remote from an intended targeted key or too far outside of the expected key. If the point of selection is in an adjacent key, it should be used in the statistics (unless the keys are large and the point is in a distant part of the key). If the point of selection is on the wrong side of the keyboard, it should be discarded as a misentry. Optionally, rejected keys can end the offset test.

The user should be able to end or escape the offset test at any time by entry of an escape sequence of a predetermined key or keys as determined by the control program. The system then uses only the completed portion of the test to calculate the offset. The user could enter only one character and then end the test; this allows the user to set the offset deliberately. If the first character in the test string is a "bull's eye" key with a point in the center of the key, then the user can use the first character of the test string to do a conventional parallax adjustment.

However, it is advantageous to keep a parallax adjustment which is separate from the soft keyboard offset adjustment. The user may need to change the parallax adjustment as the relative position of the device changes in different situations. However, the soft keyboard offset adjustment would not change when the parallax did since the user's data entry habits could be the same.

The offset is applicable not only to soft keys, but also to other selectable items such as icons, hypertext links, and so forth. This is because users may tend to select these items by targeting the bottoms of the items instead of the centers, just as with a soft keyboard. Examples of other systems in which the keyboard of this invention will have utility are shown and described in U.S. Pat. No. 5,539,479 issued Jul. 23, 1996, assigned to common ownership with the invention here described, and to which the interested reader is referred.

In the drawings and specifications there has been set forth a preferred embodiment of the invention and, although specific terms are used, the description thus given uses terminology in a generic and descriptive sense only and not for purposes of limitation.

What is claimed is:

1. A mobile client computer which compensates for user keying errors comprising:

a housing sized to be held in and manipulated by the hand of a user;

a processor mounted within the housing and processing digital data;

memory mounted within the housing for storing digital data and coupled to the processor;

a display mounted in the housing and coupled to the processor and the memory to display information derived from digital data processed by the processor;

an input digitizer mounted in the housing and disposed over the display, the digitizer being coupled to the processor and enabling input of digital data by a user; and a control program stored in the memory and accessible by the processor to direct the processing of digital data by the processor;

the control program and the processor cooperating, when the control program is executing on the processor;

(a) in displaying a plurality of user selectable elements, each defining (I) a determinable center point, (ii) a zone about the center point, and (iii) an entry corresponding to the zone and selectable by a user targeting the zone; and (b) in executing an offset test by (I) recording an entry selected by a user targeting a selectable element and (ii) calculating any displacement of the user's targeted point from the center point of the targeted selectable element; and (c) thereafter adjusting entries by the user in accommodation of the calculated displacement to assure that misplaced user targeting of a selectable element is recognized as the desired selectable element.

2. A mobile client computer according to claim 1 wherein the display is oriented in use with a vertical display axis and a horizontal display axis and further wherein the control program and the processor cooperate, when the control program is executing on the processor, to calculate a horizontal displacement of the user's targeted point from the center point.

3. A mobile client computer according to claim 1 wherein the display is oriented in use with a vertical display axis and a horizontal display axis and further wherein the control program and the processor cooperate, when the control program is executing on the processor, to calculate a vertical displacement of the user's targeted point from the center point.

4. A mobile client computer according to claim 1 wherein the display is oriented in use with a vertical display axis and a horizontal display axis and further wherein the control program and the processor cooperate, when the control program is executing on the processor, to calculate a horizontal and vertical displacement of the user's targeted point from the center point.

5. A mobile client computer according to claim 1 wherein the control program and the processor cooperate, when the control program is executing on the processor, in defining a predetermined sequence of selectable elements to be targeted by a user and used in the calculation of a displacement.

6. A mobile client computer according to claim 5 wherein the control program and the processor cooperate, when the control program is executing on the processor, in defining an escape sequence by which a user may terminate the sequential targeting of selectable elements.

7. A mobile client computer according to claim 5 wherein the control program and the processor cooperate, when the control program is executing on the processor, in discarding for purposes of calculation any targeted selectable element which is remote from a selectable element identified by its place in the sequence as being an intended targeted selectable element.

8. A mobile client computer according to claim 1 wherein the control program and the processor cooperate, when the control program is executing on the processor, in displaying as a selectable element a hexagonal outline soft key and further wherein the zone is circular.

9. A mobile client computer according to claim 8 wherein the zone has a diameter such that the hexagonal outline may circumscribe the zone.

10. A computer which compensates for user keying errors comprising:

a housing;

a processor mounted within the housing and processing digital data;

memory mounted within the housing for storing digital data and coupled to the processor;

a display coupled to the processor and the memory to display information derived from digital data processed by the processor; and a control program stored in the memory and accessible by the processor to direct the processing of digital data by the processor;

the control program and the processor cooperating, when the control program is executing on the processor:

(a) in displaying a plurality of user selectable elements, each defining (I) a determinable center point, (ii) a zone about the center point, and (iii) an entry corresponding to the zone and selectable by a user targeting the zone; and (b) in executing an offset test by (I) recording an entry selected by a user targeting a selectable element and (ii) calculating any displacement of the user's targeted point from the center point of the targeted selectable element; and (c) thereafter adjusting entries by the user in accommodation of the calculated displacement to assure that misplaced user targeting of a selectable element is recognized as the desired selectable element.

11. A computer according to claim 10 wherein the display is oriented in use with a vertical display axis and a horizontal display axis and further wherein the control program and the processor cooperate, when the control program is executing on the processor, to calculate a horizontal displacement of the user's targeted point from the center point.

12. A computer according to claim 10 wherein the display is oriented in use with a vertical display axis and a horizontal display axis and further wherein the control program and the processor cooperate, when the control program is executing on the processor, to calculate a vertical displacement of the user's targeted point from the center point.

13. A computer according to claim 10 wherein the display is oriented in use with a vertical display axis and a horizontal display axis and further wherein the control program and the processor cooperate, when the control program is executing on the processor, to calculate a vertical and a horizontal displacement of the user's targeted point from the center point.

14. A computer according to claim 10 wherein the control program and the processor cooperate, when the control program is executing on the processor, in defining a predetermined sequence of selectable elements to be targeted by a user and used in the calculation of a displacement.

15. A computer according to claim 14 wherein the control program and the processor cooperate, when the control program is executing on the processor, in defining an escape sequence by which a user may terminate the sequential targeting of selectable elements.

16. A computer according to claim 14 wherein the control program and the processor cooperate, when the control program is executing on the processor, in discarding for purposes of calculation any targeted selectable element which is remote from a selectable element identified by its place in the sequence as being an intended targeted selectable element.

17. A computer according to claim 10 wherein the control program and the processor cooperate, when the control program is executing on the processor, in displaying as a selectable element a hexagonal outline soft key and further wherein the zone is circular.

18. A computer according to claim 17 wherein the zone has a diameter such that the hexagonal outline may circumscribe the zone.

19. A display generating system which compensates for user keying errors comprising:

a housing;

a processor mounted within the housing and processing digital data;

memory mounted within the housing for storing digital data and coupled to the processor;

the processor and the memory cooperating in supplying digital data driving a display of visual images; and a control program stored in the memory and accessible by the processor to direct the processing of digital data by the processor;

the control program and the processor cooperating, when the control program is executing on the processor:

(a) in displaying a plurality of user selectable elements, each defining (I) a determinable center point, (ii) a zone about the center point, and (iii) an entry corresponding to the zone and selectable by a user targeting the zone; and (b) in executing an offset test by (I) recording an entry selected by a user targeting a selectable element and (ii) calculating any displacement of the user's targeted point from the center point of the targeted selectable element; and (c) thereafter adjusting entries by the user in accommodation of the calculated displacement to assure that misplaced user targeting of a selectable element is recognized as the desired selectable element.

20. A system according to claim 19 wherein the supplied digital data drives the display to be oriented in use with a vertical display axis and a horizontal display axis and further wherein the control program and the processor cooperate, when the control program is executing on the processor, to calculate a horizontal displacement of the user's targeted point from the center point.

21. A system according to claim 19 wherein the supplied digital data drives the display to be oriented in use with a vertical display axis and a horizontal display axis and further wherein the control program and the processor cooperate, when the control program is executing on the processor, to calculate a vertical displacement of the user's targeted point from the center point.

22. A system according to claim 19 wherein the supplied digital data drives the display to be oriented in use with a vertical display axis and a horizontal display axis and further wherein the control program and the processor cooperate, when the control program is executing on the processor, to calculate a vertical and a horizontal displacement of the user's targeted point from the center point.

23. A system according to claim 19 wherein the control program and the processor cooperate, when the control program is executing on the processor, in defining a predetermined sequence of selectable elements to be targeted by a user and used in the calculation of a displacement.

24. A system according to claim 23 wherein the control program and the processor cooperate, when the control program is executing on the processor, in defining an escape sequence by which a user may terminate the sequential targeting of selectable elements.

25. A system according to claim 24 wherein the control program and the processor cooperates when the control program is executing on the processor, in discarding for purposes of calculation any targeted selectable element which is remote from a selectable element identified by its place in the sequence as being an intended targeted selectable element.

26. A system according to claim 19 wherein the control program and the processor cooperate, when the control program is executing on the processor, in displaying as a selectable element a hexagonal outline soft key and further wherein the zone is circular.

27. A system according to claim 26 wherein the zone has a diameter such that the hexagonal outline may circumscribe the zone.

* * * * *